Jan. 2, 1940.   W. M. CRAWFORD   2,185,745
BELT TIGHTENER
Filed Aug. 23, 1938
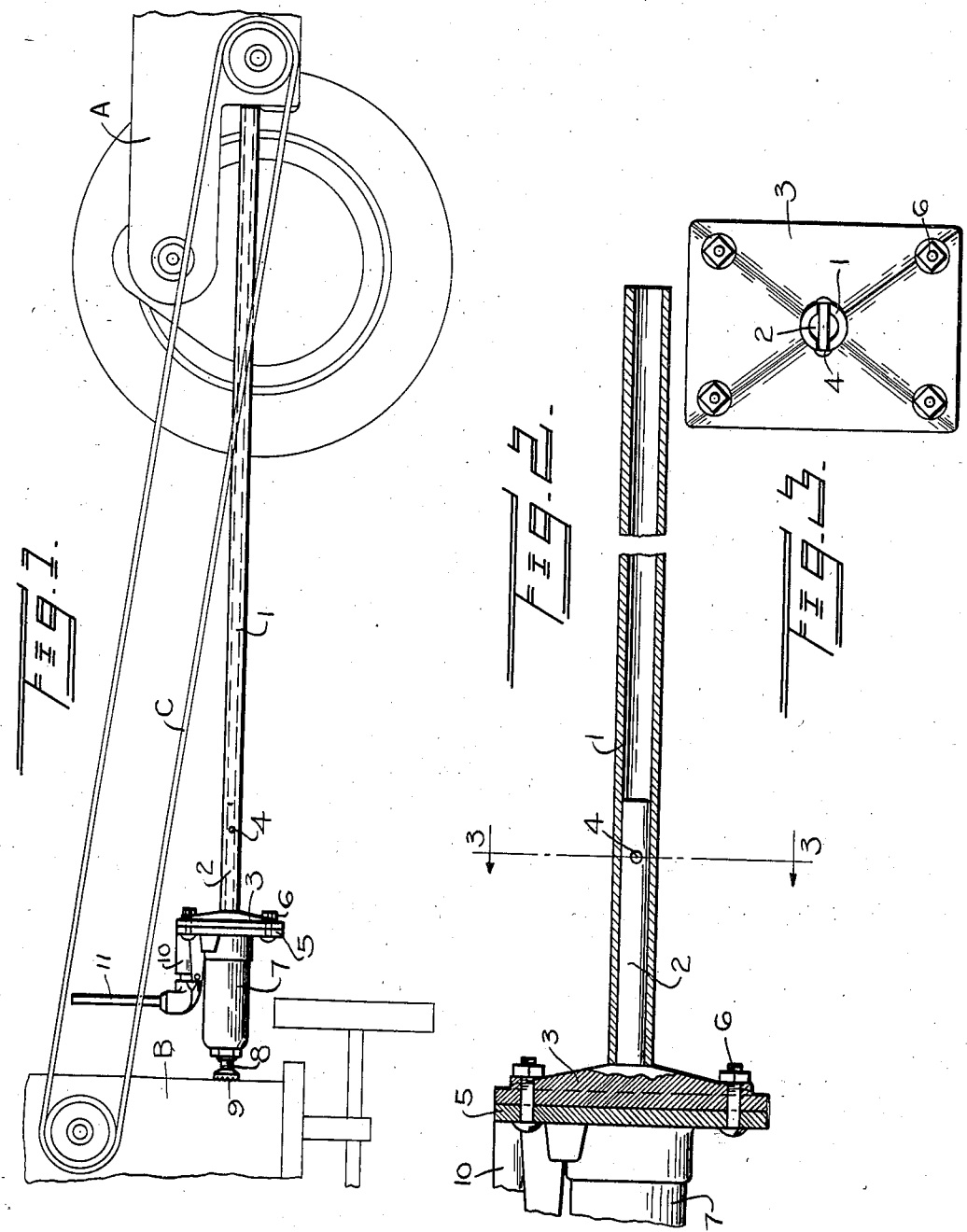
William M. Crawford
INVENTOR
BY Victor J. Evans & Co.
ATTORNEYS Patented Jan. 2, 1940

2,185,745

UNITED STATES PATENT OFFICE 2,185,745

BELT TIGHTENER

William M. Crawford, Bondurant, Iowa

Application August 23, 1938, Serial No. 226,372

1 Claim. (Cl. 254—1)

This invention relates to belt tighteners, and its general object is to provide a tightener in the form of a bracing device primarily designed to be mounted in bridging relation between an automotive or power drive means such as a tractor, and a machine to be driven thereby through the medium of a belt, such as a thrasher, baler, mill, saw, et cetera, the bracing device including jacking means to vary the length of the device to separate the machine and tractor for drawing the belt taut, with the result it will be seen that my device not only functions to tighten the belt, but the latter is held in a taut condition, due to the device holding the tractor and machine properly spaced at all times, regardless of the type of wheels on the tractor, or the slippery condition of the ground surface supporting the same.

A further object is to provide a belt tightening device of the character set forth, that can be easily and expeditiously applied and removed with respect to the tractor and the machine driven thereby, and the device is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a side elevation of the device which forms the subject matter of the present invention in use.

Figure 2 is a fragmentary sectional view of the device per se.

Figure 3 is a sectional view taken approximately on line 3—3 of Figure 2, looking in the direction of the arrows.

Referring to the drawing in detail, the letter A indicates a power drive device such as a tractor, and B a machine to be driven thereby through the medium of the belt C, the latter being trained about the drive pulley of the tractor and the driven pulley of the machine, in the usual manner.

It might be mentioned here that considerable difficulty has been experienced in the past in retaining the belt C in a taut condition, in order to prevent slippage thereof, especially if the ground or supporting surface of the tractor and machine is slippery or the tractor is equipped with rubber tires, as the tractor and machine or either tend to slide in the direction of the other. While staking, chuck blocks and other means are generally employed to remedy the condition set forth, such has proven unsatisfactory as well as requires considerable time and effort in setting the same in place, but by the use of my device all the disadvantageous features mentioned have been overcome, as well be apparent upon inspection of Figure 1.

My device preferably includes a hollow or tubular bar 1 of any length suitable for the purpose, and mounted in one end thereof is the shank 2 of a head 3, the latter being in the form of a rectangular shaped block enlarged on one side toward its center from which extends the shank 2 that is fixed within the bar 1 by a headed pin 4 extending transversely through the shank and bar, as best shown in Figure 3.

The outer face of the head is flat and mounted thereon in face to face engagement therewith is the base 5 of a lifting jack, which is secured to the head by bolt and nut connections 6, the bolts extending through openings adjacent to the four corners of the base and head, as best shown in Figure 3.

The lifting jack is preferably of the hydraulic type as shown, and includes a casing 7 formed on the base, with a stem 8 slidably mounted in the casing and through the same, the stem having a serrated head or saddle 9 secured to the outer end thereof. Pumping means 10 is mounted on the base and communicates with the casing to supply fluid to suitable means for urging the stem outwardly upon operation of the pumping means which includes a handle 11, and it will be obvious that the jack also includes valve means for relieving the fluid pressure against the stem, to allow the latter to be moved inwardly within the casing.

While I have illustrated a hydraulic jack included in my device, I want it understood that any type of jack may be used, which is suitable for the purpose.

It is believed from the foregoing and the disclosure in the drawing, that the use of my device will be obvious, but it might be mentioned that the tractor and the machine to be driven thereby are placed in relative position, as suggested in Figure 1 thence the belt is applied to the pulleys. The tractor is then moved for drawing the belt taut, and my device is placed in bridging relation between the tractor and machine, preferably with the free end of the bar 1 engaged with the tractor, while the head of the jack is engaged with the machine, and when so arranged the jack is operated to set up a binding action between the ends of the device and the tractor and machine, so as to prevent movement of either or both toward each other, and therefore it will be seen that the device acts to hold the belt in a taut condition.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A belt tightener for disposal in bridging relation between a tractor and a machine to be driven thereby through the medium of a belt, and comprising a tubular bar for engagement of one end thereof with the tractor, a head thickened on one face toward its center and its opposite face being flat, a shank extending centrally from the thickened face and secured to and mounted in the opposite end of the bar, a hydraulic jack including a base secured to the head in engagement with the flat face thereof for disposal in alignment with the bar, and said jack being adapted for engagement with the machine for cooperation with the bar to separate said tractor and machine for drawing and holding the belt taut.

W M CRAWFORD.